United States Patent Office 2,997,478
Patented Aug. 22, 1961

2,997,478
OXYGENATED PIPERIDINES AND PROCESSES FOR THEIR MANUFACTURE
Lewis A. Walter, Madison, and Nathan Sperber, North Caldwell, N.J., assignors to Schering Corporation, Bloomfield, N.J., a corporation of New Jersey
No Drawing. Filed July 21, 1958, Ser. No. 749,649
12 Claims. (Cl. 260—294.3)

This invention relates to a new group of therapeutically useful substances and processes for their manufacture. More particularly, our invention is directed to racemates of oxygenated piperidine bases having the following general formula:

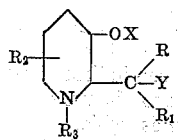

wherein X is a member of the group consisting of hydrogen and lower alkanoyl; each of R and $R_1$ represents a phenyl group which may be further substituted by alkyl (e.g., lower alkyl), alkoxy (e.g., lower alkoxy), and halogen radicals; $R_2$ is a member of the group consisting of hydrogen and lower alkyl, $R_3$ is a member of the group consisting of hydrogen, lower alkyl and lower alkenyl while Y represents a hydrogen, hydroxyl or lower alkanoyloxy radical; and their corresponding optical isomers.

Racemates of the compounds of the general formula, as well as the $d$- (+) and $l$- (−) isomers thereof, exhibit a marked effect upon the central nervous system or are convertible into compounds having such an effect. In general, our compounds may be grouped as central nervous system stimulants and appear to have influence upon that portion of the brain concerned with the function of alerting. Compounds having such activity possess a therapeutic application in the treatment of psychotic and psychoneurotic depressive states. Aside from use in treatment of uncomplicated depressive states, the compounds of our invention may be applied in overcoming emotional fatigue and promoting wakefulness. Contrary to the action of most central nervous system stimulants which exhibit sympathomimetic and pressor effects, the compounds of our invention have no concomitant depressive effect upon appetite.

Although the compounds of this invention, in general, exhibit the foregoing properties, the racemates of those compounds wherein each of X, Y and $R_2$ is hydrogen and the $d$-isomers of those compounds wherein $R_3$ is, in addition, a methyl group, are particularly useful in such indications. More specifically, we have found $dl$-2-benzhydryl-3-hydroxypiperidine and even more significantly the $d$-isomer of 1-methyl-2-benzhydryl-3-hydroxypiperidine to be potent central nervous system stimulants possessing a very desirable therapeutic index. It is now known in the art that certain benzhydryl piperidines stimulate the central nervous system; an example of such compound being 1-piperidyl diphenylcarbinol. We have found that by moving the oxygen function in or adding an additional oxygen function to the molecule of the piperidine ring at the 3-position, preferably in the form of a hydroxy group there is obtained a central nervous system stimulant which is at least 4 to 5 times as potent as the nuclear desoxy analog. This increase in potency is of major importance, since for an equivalent dose a greater response is obtained, and a smaller effective dose may be administered, thus lessening the manifestation of side effects. As with most stimulants, over-dosage would lead to nausea, vomiting or insomina, each of which is markedly reduced if not completely eliminated as a side effect of our compounds. Our preferred racemates and the $d$-isomers of the 1-methylated derivatives thereof and their congeners are particularly useful as adjuncts in the treatment of chronic diseases whereby they assist in improving the mental outlook of the patient. Indeed, the $d$-isomer of 1-methyl-2-benzhydryl-3-hydroxypiperidine is most preferred in this regard.

Our new therapeutic substances are preferably administered orally in the form of tablets, although other pharmaceutical dosage units such as elixirs and the like are easily prepared. Where parental administration is indicated, for example, in the case of a severely depressed patient who refuses oral medication, the compounds lend themselves to formulation into aqueous solutions of their non-toxic acid addition salts. As indicated heretofore, the therapeutic indices of the compounds are very favorable and, in the case of $dl$-2-benzhydryl-3-hydroxypiperidine and the $d$-isomer of the corresponding 1-methyl derivative thereof, is in the order of 200. Although in view of the high potency of some of the compounds a low dosage in the order of 1 mg. per dose administered twice daily is sufficient for the treatment of emotional fatigue and mild depression, higher dosages in the order of 5–25 mg. daily may be employed where indicated.

The preferred racemates of our invention, the 2-benzhydryl-3-hydroxypiperidines, may be prepared in a convenient manner by the ammoniacal hydrolytic cleavage of 2-furyl-benzhydryl ketones followed by the ring closure resulting in the formation of the 2-benzhydryl-3-hydroxypyridines, all taking place in one operative step. For example, as shown in the following equations, acylation of diphenylmethane (II) with ethyl 2-furoate (I) in liquid ammonia in the presence of potassium amide yields 2-furyl benzhydryl ketone (III). In place of potassium amide other alkali metal amides such as sodamide and lithium amide can also be used. In addition organometallics, such as for example, phenyllithium and butyllithium are also employed, although we have found better yields are obtained with potassium amide. The ketone, III, upon subjection to the action of ammonia at elevated temperatures, undergoes cleavage of the heterocyclic nucleus and recyclizes forming the pyridine compound, IV. Hydrogenation of this latter compound, (IV) yields racemic 2-benzhydryl-3-hydroxypiperidine (V). The hydrogenation can be carried out catalytically using platinum catalyst at a hydrogen pressure of approximately 50 lbs. The reduction is generally effected in a Parr shaker at room temperature, although the conditions for the reduction are not particularly critical. In addition to platinum, other catalysts such as Raney nickel are particularly useful, although with Raney nickel, higher temperatures and pressures are required. The hydrogenation can also be effected by subjecting the pyridine compound to the action of nascent hydrogen generated by dissolving metals in alcohol, such as sodium in ethanol. We prefer to employ Raney nickel catalyst in this step, which produces a higher yield of a single geometric isomer.

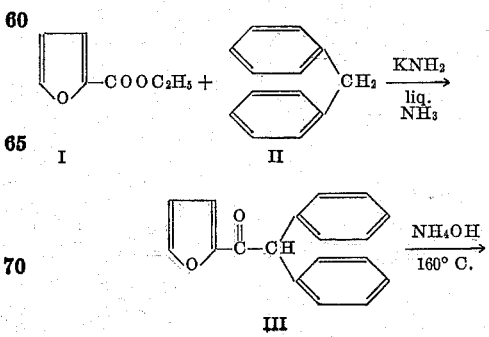

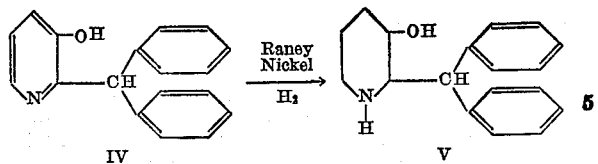
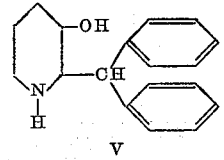

It is understood that the foregoing discussion and synthesis are applicable to the preparation of other 2-benzhydryl-3-hydroxypiperidines, the structure of which would be determined by the starting material. For example, where in place of ethyl 2-furoate (I), one employs ethyl 5-methyl-2-furoate, the ultimate product is the racemate of 2-benzhydryl-3-hydroxy-6-methylpiperidine.

Alternatively, we have found that a furfurylamine upon successive treatment with hydrogen bromide and ammonia yields a benzhydryl compound of the general formula. The hydrolytic cleavage and ring closure in this instance is carried out according to procedures fully described in the literature. For example, according to the following equation (B), benzhydryl-2-furyl ketone (III) is oximated with hydroxylamine in the usual manner and the oxime (VI) so obtained is hydrogenated in the presence of Raney nickel catalyst whereby there is obtained α(2-tetrahydrofuryl)-β-diphenyl-ethylamine (VII). Treating this latter compound VII with anhydrous hydrogen bromide in glacial acetic acid causes cleavage of the tetrahydrofuryl ring and cyclization is effected by treatment with aqueous ammonia whereby racemic 2-benzhydryl-3-hydroxypiperidine (V) is obtained.

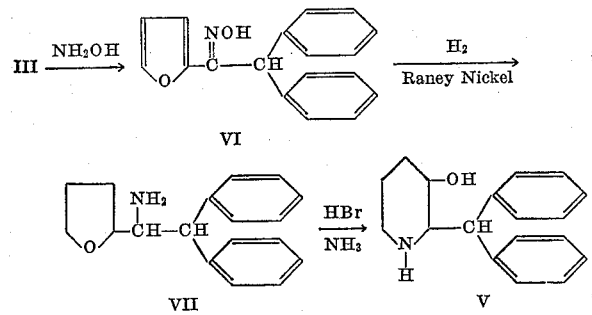

In addition to the foregoing, we have found that cyclization procedures as is exemplified by the following series or reactions may be used to prepare the benzhydryl piperidines of our invention. Although the procedure depicted is directed to the preparation of dl-2-benzhydryl-3-hydroxypiperidine, it is understood that appropriate substitution in the starting material will give rise to a similarly substituted final product.

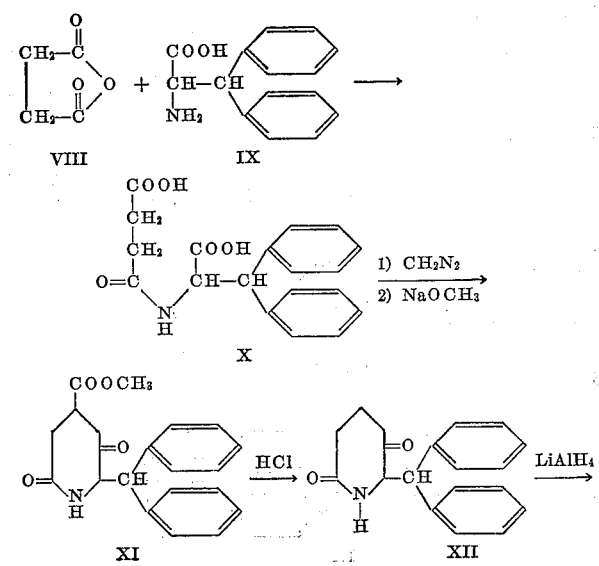

In the foregoing reaction sequence, β,β-diphenylalanine (IX) is acylated by warming with succinic anhydride (VIII) whereupon the intermediate N-succinoyl-diphenylalanine (X) is produced. Esterification of the free carboxyl groups is conveniently carried out, preferably with diazomethane, and the dimethyl ester thus formed is subjected to a Dieckmann reaction using sodium alkoxide catalyst resulting in ring closure and the formation of the 2-benzhydryl-4-carbomethoxy-3,6-diketopiperidine (XI). Hydrolysis and decarboxylation is effected by treating XI with aqueous acid giving XII which is reduced with lithium aluminum hydride in the usual manner giving rise to Compound V.

Although it has been indicated heretofore that the foregoing procedures lend themselves to the preparation of piperidine compounds which may contain substituents other than hydroxy or benzhydryl, not all of the procedures are adaptable to the preparation of all the variations indicated in the general formula by reason of inaccessability of starting material or cleavage of a substituent during the reaction as would occur with a methoxy substituent in reaction sequence B. We have thus found that substituted compounds of the general formula wherein Y is hydrogen can be prepared according to the following sequence of reactions:

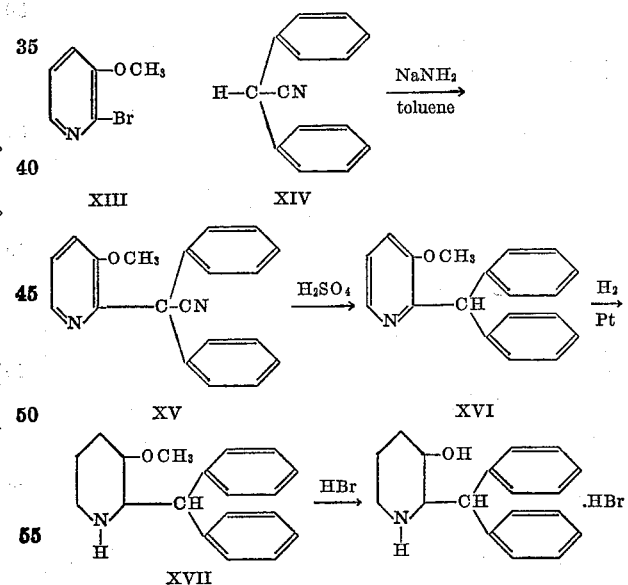

In the above equation, diphenylacetonitrile (XIV) is alkylated in the usual manner with 2-bromo-3-methoxypyridine (XIII) using sodium amide catalyst whereupon the corresponding 2-pyridyldiphenylacetonitrile (XV) is produced. Hydrolysis and decarboxylation with aqueous mineral acid, such as sulfuric acid, results in the elimination of the nitrile group; and the benzhydrylpyridine compound, XVI, so obtained is reduced either catalytically or with sodium in alcohol to form 2-benzhydryl-3-methoxypiperidine (XVII) which is demethylated by refluxing with hydrobromic acid to give V. Quite obviously, other compounds within the scope of this invention wherein Y is hydrogen can be prepared according to this synthesis by using the appropriate substituted diphenylacetonitrile, as well as alkoxy-piperidines which are further substituted by alkyl groups.

The hydroxylated compounds of our invention undergo reactions by means of well described procedures whereby esters are produced. As indicated heretofore, although, for example, the preferred racemates of our invention, the dl-2-benzhydryl-3-hydroxypiperidines, and the optically active isomers thereof such as d-1-methyl-2-benzhydryl-3-hydroxypiperidines are the nuclearly hydroxylated substances, the derivatives such as the esters may more properly lend themselves to a specific indication or mode of administration by virtue of selectivity of action or differences in solubility.

The piperidyl diphenyl carbinols of our invention, i.e., compounds wherein Y is OH or a derivative thereof, are synthesized from appropriately substituted hydroxypicolinic esters or hydroxy-2-pyridyl aryl ketones by means of conventional Grignard-type reactions as described below. In order to prepare 2-(3-hydroxy)-piperidyldiphenyl carbinol, for example, we prefer to employ 3-hydroxy-2-benzylpyridine (XVIII) as the starting material. In the following sequence of reactions, Compound XVIII is first etherified with phenyl trimethylammonium bromide in the presence of sodium methoxide yielding XIX. The 2-benzyl-3-methoxypyridine (XIX) is then oxidized with alkaline potassium permanganate, for example, to afford the requisite intermediate, 2-benzoyl-3-methoxypyridine XX which is demethylated with hydrobromic acid to form 2-benzoyl-3-hydroxypyridine XXI. Subjecting XXI to the conventional Grignard type reaction affords α,α-diphenyl-3-hydroxy-2-pyridinemethanol XXII which can be hydrogenated catalytically by means of metal (e.g., platinum) to produce α,α - diphenyl - 3 - hydroxy-2-piperidinemethanol XXIII. Alternatively, subjecting Compound XX to the Grignard reaction gives 2-(3-methoxy-piperidyl)-diphenyl carbinol XXIV which can be reduced with hydrogen iodide by known techniques to XVI and thus converted to the desired compounds as shown previously in reaction sequence D.

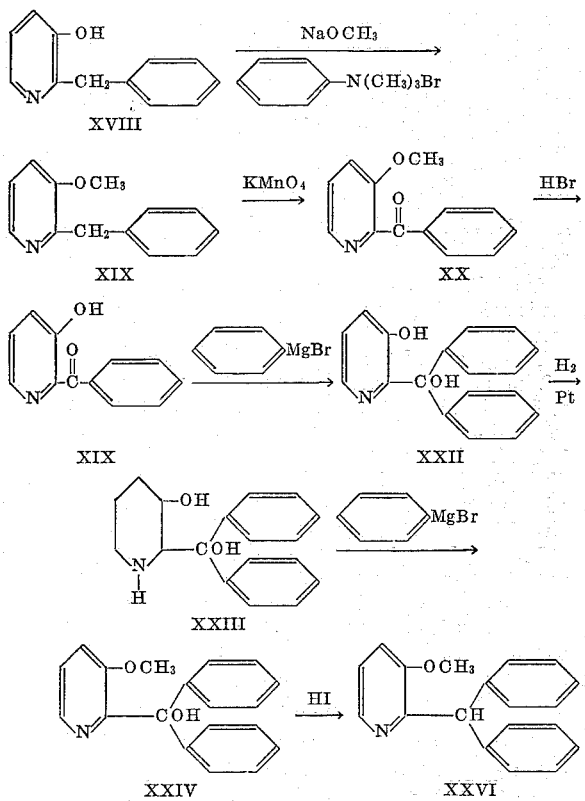

The Grignard reagent in the foregoing reaction is phenylmagnesium bromide; however, it is understood that other reagents such as substituted phenylmagnesium halides, e.g., chlorophenylmagnesium bromide, alkoxyphenylmagnesium halides, methoxyphenylmagnesium bromide and the like may be used with equal advantage whereby the products so obtained contains a similar substituent. In place of the Grignard reagents, other condensing agents, such as lithium aryls, e.g., phenyllithium, can also be employed to effect these Grignard-type reactions.

Alternatively, by employing a 3-alkoxypicolinic ester, exemplified in the following equation by methyl-3-methoxy picolinate XXV, and subjecting the same to a Grignard reaction with phenylmagnesium bromide, for example, Compound XXIV is obtained.

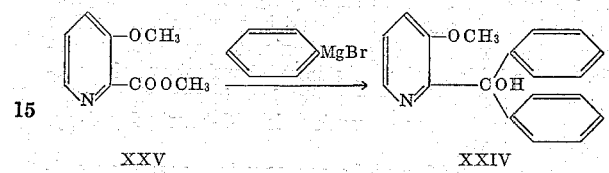

In the Grignard-type reactions shown above, it is not necessary that the group attached to the pyridyl ring be an ether since we have found that merely by using an extra equivalent of Grignard reagent the destructive action of the active hydrogen atom is overcome and the desired product is obtained.

All of the compounds prepared heretofore which contain a free OH function may be derivatized with carboxylic acid derivatives, for example, acetic anhydride, propionylchloride, t-butylacetyl chloride and the like or etherized as indicated. Acylation may be selectively effected so as to acylate a hydroxyl function in preference to the secondary amino group forming the heterocyclic ring. All of the piperidine compounds prepared as described heretofore are secondary amine racemates which are easily converted into tertiary amines either by direct alkylation such as is effected by formic acid and formaldehyde with an alkyl halide and an acid acceptor such as alkali carbonates, e.g. sodium carbonate, potassium carbonate, sodium bicarbonate, potassium bicarbonate, a sterically hindered tertiary amine, e.g. dicyclohexyl ethyl amine, diisopropyl ethyl amine; or by quaternization of the pyridine precursor with an appropriate alkyl halide, e.g. ethyl bromide, propyl chloride, or alkyl ester, such as an alkyl aryl sulfonate, e.g. methyl-p-toluene sulfonate; alkyl sulfate, e.g. methyl sulfate or alkyl alkane sulfonate, e.g. methyl methane sulfonate, followed by hydrogenation of the pyridinium compound so obtained.

These amine racemates are resolved into their corresponding optically active d- (+) and l- (—) forms by reaction of the racemates with certain optically active acids. More specifically the optically active d- and l-isomers of the compounds of our invention are prepared by treating a dl-amine, such as described hereinabove, with a d- or l-isomer of a substituted succinic acid wherein the substituents are, for example, alkyl, aryl, lower alkoxy or halogen substituted aryl, thienyl, cycloalkyl, or hydroxyl radicals, in the presence of an organic solvent, i.e., a non-reactive compatible organic solvent such as an aliphatic alcohol to cause the formation of the corresponding diastereoisomeric salts thereof, and separating the salts of the desired d- and l-isomers by crystallization. In carrying out this process, it is normally preferable to use equivalent amounts of racemate and optically active acid. However, these proportions can be varied substantially and mole ratios of amine racemate to optically active acid of 2:1 are wholly operative and indeed under certain circumstances preferred. It should be noted that it is particularly advantageous to employ either of the d- or l-isomers of phenylsuccinic acid as the resolving agent, particularly where it is sought to separate out the optical antipodes of 1-methyl-2-benzhydryl-3-hydroxypiperidine and 2-benzhydryl-3-hydroxypiperidine. The liberation of the isomeric free amine can be accomplished by the introduction of the isolated isomeric salt into aqueous alkali (e.g., sodium carbonate, potassium hydroxide, sodium hydroxide and the like) and a suitable selective organic solvent, that is, a substantially water-immiscible solvent as for example, diethyl ether, benzene, methyl isobutyl ketone, isopropyl acetate, isobutyl alcohol, sec. butyl alcohol and the like, in which the free amine base is soluble.

The d- and l-optical isomers obtained in accordance with the practise of my invention are obtained in pure form and substantially free of their optical antipodes and can be reacted directly with suitable mineral and organic acids, such as, for example, hydrobromic acid, sulfuric acid, phosphoric acid, tartaric acid, citric acid, succinic acid and most desirably hydrochloric acid preferably in equimolar amounts and in a suitable solvent to form the corresponding non-toxic, therapeutically useful acid addition salts. As noted hereinabove the preferred optically active isomer obtained in accordance with the practise of our invention is d-2-benzhydryl-3-hydroxypiperidine.

Further illustrative of the compounds prepared according to the practise of our invention are 2-(3-hydroxypiperidyl)-3,4-dimethylphenyl-phenyl carbinol, 2-benzhydryl-3-hydroxy-6-methyl-piperidine, d-2-benzhydryl-3-hydroxy - 6 - methylpiperidine, l-2-benzhydryl-3-hydroxy-6-methylpiperidine, 2-benzhydryl-3-acetoxypiperidine, d-2-benzhydryl - 3 - acetoxypiperidine, l-2 - benzhydryl-3-acetoxypiperidine, α,α - diphenyl-3-hydroxy-2-piperidinemethanol, d-α,α-diphenyl-3-hydroxy-2-piperidinemethanol, l-α,α-diphenyl-3-hydroxy-2-piperidinemethanol, l-1-allyl-3 - benzhydryl-3-hydroxypiperidine, d-1-allyl-2-benzhydryl-3-hydroxypiperidine, 1-allyl-2-benzhydryl-3-hydroxypiperidine, 1 - methyl-2-benzhydryl-3-propionoxypiperidine, d-1-methyl-2-benzhydryl-3-propionoxypiperidine, l-1-methyl - 2 - benzhydryl-3-propionoxypiperidine, 2-(1-butylpiperidyl)di-p-chlorophenylcarbinol, d-2-(1-butylpiperidyl) di - p - chlorophenylcarbinol, and l-2(1-butylpiperidyl)2-di-p-chlorophenylcarbinol, 2 - (1 - methyl-3-acetoxypiperidyl)-di-o-methylphenylcarbinol, d - 2 - (1-methyl - 3 - acetoxypiperidyl)-di-o-methylphenylcarbinol acetate, and l - 2 - (1-methyl-3-acetoxypiperidyl)-di-o-methylphenylcarbinol acetate.

The d- and l-isomers of our invention either as the free base or in the form of a non-toxic salt thereof e.g., maleate, gluconate, hydrochloride etc. can be administered orally in the form of tablets, elixirs, capsules and the like. In tablet form, they are compounded with an inert carrier which may contain a suitable binder, such as, for example, gums, starches and sugars. It may also be incorporated into a gelatin capsule, and it can also be formulated into elixirs which have the advantage of being susceptible to manipulations in flavor by the addition of standard natural or synthetic flavoring materials. Where desired, the isomers of our invention and their corresponding salts can be administered parenterally by incorporation thereof into suitable injectable solutions employing such non-toxic carriers, as for example, water, propylene glycol, polyethylene glycol and the like.

This application is a continuation-in-part of our copending U.S. application, Serial No. 597,857, filed July 16, 1956, now abandoned.

The following examples are further illustrative of the invention:

EXAMPLE 1

*2-benzhydryl-3-hydroxypiperidine*

METHOD A

The requisite intermediate, 2-furyl benzhydryl ketone, is prepared as follows:

A solution of 168 g. of diphenylmethane in 300 ml. of ether is added with stirring over a period of one-half hour to a suspension of potassium amide in 1500 ml. of liquid ammonia (prepared from 39.1 g. of potassium). Fifteen minutes later, a solution of 70 g. of ethyl furoate in one liter of ether is added dropwise and the ammonia is allowed to evaporate. The ether solution is refluxed for two hours, cooled and extracted with water. The ether solution is dried over anhydrous potassium carbonate, filtered and distilled on a steam bath. The residue is triturated with hexane and crystallizes, yielding 96 g. of 2-furyl benzhydryl ketone, M.P. 103–104°.

A mixture comprising 48 grams of 2-furyl benzhydryl ketone, 1200 ml. of methanol and 800 ml. of concentrated aqueous ammonia are sealed in an autoclave and heated with shaking at 150–160° for twelve hours. The dark solution is evaporated to half volume on a steam bath and 17 g. of sodium hydroxide in 200 ml. of water is added. Evaporation is continued on the steam bath until ebullition ceases. The oily insoluble material is removed by extraction with benzene. The aqueous solution is decolorized with 10 g. of charcoal and saturated with carbon dioxide, whereupon 2-benzhydryl-3-hydroxypyridine precipitates as a tan solid. The crude hydroxypyridine is purified by recrystallization from methanol with the aid of charcoal, yielding 17 g. of white crystals, M.P. 221–222°.

A solution of 25 g. of 2-benzhydryl-3-hydroxypyridine in 250 ml. of dioxane is hydrogenated with 2.5 g. of Raney nickel at 130° C. and 1500 lbs. hydrogen pressure until the hydrogen necessary to reduce the pyridine ring has been absorbed. The catalyst is filtered off, the solvent distilled, and the residue is distilled in vacuo to give 2-benzhydryl - 3 - hydroxypiperidine, B.P. 200–202° C./3 mm. Hg.

Alternatively, 10 g. of 2-benzhydryl-3-hydroxypyridine in 200 ml. of acetic acid is hydrogenated in a Parr shaker at 50° C. and 60 lbs. hydrogen pressure with one gram of $PtO_2$, with reduction of the pyridine ring being completed in about twelve to twenty-four hours. The catalyst is filtered off and the solvent is removed in vacuo, leaving an oily residue which partly crystallizes on cooling. Two hydrogenation batches are combined and the oily solid obtained is shaken with ether and filtered to remove the insoluble material which is discarded. The ether solution is extracted with dilute hydrochloric acid and the layers are separated. The aqueous fraction is made basic with excess sodium hydroxide and the oil which separates is extracted with ether, dried over potassium carbonate, filtered and concentrated. Upon distillation of the residue there is obtained 2-benzhydryl-3-hydroxypiperidine as a clear viscous oil which crystallizes from hexane, M.P. 94–96° C. The base is converted to its maleate salt by treating same with one equivalent of maleic acid in isopropyl acetate whereupon the salt precipitates. The salt is purified by recrystallization from aqueous alcohol, M.P. 238–240° C.

In addition to the above, the hydroxypyridine intermediate is reduced to the piperidine compound in the following manner:

Ten grams of 2-benzhydryl-3-hydroxypyridine in 750 ml. of absolute alcohol is heated and thirty grams of sodium is added as rapidly as possible. The mixture is refluxed until all the sodium dissolves, and is then cooled. 200 ml. of water is carefully added and the alcohol is distilled. The residue is extracted with ether, and the ether extracts are dried and evaporated, and distilled to give 2-benzhydryl-3-hydroxypiperidine.

In the foregoing, by substituting p-chlorodiphenylmethane, p-methoxydiphenylmethane, p,p'-dichlorodiphenylmethane for diphenylmethane and by using platinum as a catalyst for reduction of the pyridine intermediate, the racemate of the corresponding substituted benzhydryl hydroxypiperidine is obtained.

METHOD B

A mixture of 26.2 g. of 2-furyl-benzhydryl ketone, prepared as described in A, 26.2 g. of hydroxylamine hydrochloride, 130 ml. of pyridine and 130 ml. of absolute alcohol is refluxed for eight hours. The mixture is concentrated to half volume and diluted with water, yielding crystalline 2-furyl-benzhydryl ketoxime, M.P. 192–194° C. Twenty grams of the oxime is hydrogenated at 100° C.–120° C. with 5 grams of Raney nickel catalyst in 400 ml. of a saturated alcoholic ammonia solution. When four molecular equivalents of hydrogen are absorbed, the reduction is stopped, the catalyst removed by filtration and the solvent is removed on a steam bath. The residue is distilled yielding (1-(2-tetrahydrofuryl)-2-diphenyl) ethylamine, B.P. 171–174° C./2 mm. Hg. The amine crystallizes on standing M.P. 104–106.5° C. (hexane) and is dissolved in 50 ml. of glacial acetic acid and 12 g. of anhydrous hydrogen bromide is bubbled slowly into the solution. The mixture is heated on a steam bath for four hours, cooled, and the excess solvent removed in vacuo. The residue is dissolved in 500 ml. of 95% alcohol and is added slowly with vigorous stirring to a solution of 10 g. of ammonia in 500 ml. of 95% alcohol. After stirring for two hours, the mixture is refluxed for one hour and then concentrated to a small volume on a steam bath. The residue is shaken with excess alkali and extracted with ether. The ether solution is dried over potassium carbonate, filtered and concentrated to a residue. Distillation of the residue in vacuo yields 2-benzhydryl-3-hydroxy-piperidine.

METHOD C

To a solution of 33.8 g. of $\beta,\beta$-diphenylalanine (J.A.C.S., 73, 56 (1951)) in 400 ml. of dimethylformamide is added 23 g. of succinic anhydride. The mixture is warmed and stirred on a steam bath for two hours. The solvent is removed in vacuo and the residue is dissolved in cold, dilute alkali. Upon the addition of acetic acid, succinoyl-$\beta,\beta$-diphenylalanine precipitates, which is removed by filtration. Twenty grams of the amide is dissolved in 500 ml. of ethyl acetate to which is added a solution of 9 g. of diazomethane in ether, while cooling. After standing overnight at room temperature, the solvent is removed in vacuo and the dimethyl ester so formed is extracted into ether which is washed with cold dilute alkali and then with water. The ether solution is dried over potassium carbonate, filtered, and the ether evaporated. The residue consisting of the crude dimethyl ester (16 g.) is dissolved in 500 ml. of benzene and distilled to remove traces of water. Two grams of sodium methoxide is then added and the solution is refluxed for three hours. The benzene is removed in vacuo and the residue is refluxed in a mixture of 200 ml. of 88% isopropanol and 5 ml. of concentrated hydrochloric acid until an enol test with ferric chloride is negative. The acid is neutralized with sodium bicarbonate and the solvent is removed in vacuo. The residue is taken up in ether, washed with dilute alkali, dried over potassium carbonate, filtered and the solvent removed in vacuo. The crude ketoamide (5.5 g.) is dissolved in absolute ether and added dropwise to a vigorously stirred solution of 5 g. of lithium aluminum hydride in 300 ml. of ether. The mixture is refluxed overnight, cooled and the complex is carefully decomposed with 20% sodium hydroxide solution. The ether layer is separated, dried over potassium carbonate and evaporated, and the residue is distilled, yielding 2-benzhydryl-3-hydroxy-piperidine.

EXAMPLE 2

*2-benzhydryl-3-hydroxy-6-methyl piperidine*

The requisite intermediate, 2-(5-methyl)-furyl benzhydrylketone M.P. 163° C.–164° C., is prepared according to the procedure of Example 1–A by substituting 77 g. of ethyl 5-methyl-2-furoate for the ethyl furoate therein.

The ammoniacal rearrangement to 2-benzhydryl-3-hydroxy-6-methyl-pyridine (M.P. 195–197° C.) with subsequent reduction using Raney nickel catalyst, yielding 2-benzhydryl-3-hydroxy-6-methyl piperidine, B.P. 195–205° C./3 mm. is effected as described in Example 1.

EXAMPLE 3

*2-benzhydryl-3-acetoxypiperidine hydrochloride*

Five grams of 2-benzhydryl-3-hydroxypiperidine is dissolved in 50 ml. of dry chloroform and 2 g. of acetic anhydride is added. The solution is shaken at room temperature for several hours and then refluxed for half an hour. The cooled solution is neutralized by shaking with cold saturated sodium bicarbonate solution. The chloroform solution is carefully dried, filtered, and one gram of dry hydrogen chloride passed into the solution. The resultant mixture is refluxed for one hour, and the chloroform is removed in vacuo. The residue is crystallized from absolute alcohol-ether to give 2-benzhydryl-3-acetoxypiperidine hydrochloride.

Alternatively, 10 grams of 2-benzhydryl-3-hydroxypyridine is warmed on the steam bath with 20 ml. of acetic anhydride for half an hour. On cooling, 2-benzhydryl-3-acetoxypyridine precipitates, which is filtered and recrystallized from benzene, M.P. 133° C.–135° C. Ten grams of the acetate is hydrogenated with $PtO_2$ catalyst in glacial acetic acid. When hydrogen absorption ceases, the solvent is removed in vacuo, and the residue is taken up in ether and washed with sodium bicarbonate solution. The ether layer is separated, dried and filtered. To the anhydrous solution is added an ether solution containing 0.75 g. of HCl gas and the mixture is stirred for a few minutes and filtered. The salt thus removed is 2-benzhydrylpiperidine hydrochloride resulting from hydrogenolysis of the acetoxy group. The ether filtrate containing 2-benzhydryl-3-acetoxypiperidine is treated with dry hydrogen chloride whereupon 2-benzhydryl-3-acetoxypiperidine hydrochloride is obtained, M.P. 287–289° C.

EXAMPLE 4

*$\alpha,\alpha$-Diphenyl-3-hydroxy-2-piperidinemethanol*

Molar equivalents of 2-benzyl-3-hydroxypyridine, phenyl trimethylammonium bromide and sodium methoxide are refluxed in dimethylformamide for three hours and the solvent is then removed in vacuo. The residue is shaken with ether and water separated and the ether is dried, filtered and distilled to give 2-benzyl 3-methoxypyridine, B.P. 114–116° at 1 mm.; M.P. 46–47° after crystallization from petroleum ether. Fifty grams of 2-benzyl-3-methoxypyridine is stirred vigorously in 800 ml. of water at 70–80° C. and 54 g. of potassium permanganate is added in small portions over a period of 6 hours. Stirring is continued until the permanganate color disappears and the product is then extracted with ether. After removing the ether, the residue is distilled, B.P. 140° C.–145° C. (1 mm. Hg), and is purified by recrystallization of the hydrochloride salt, M.P. 148–151° from isopropanol-isopropyl acetate.

Twenty grams of 3-methoxy-2-benzoylpyridine, obtained from the above hydrochloride, by treatment with aqueous alkali, is refluxed with 300 ml. of 48% hydrogen bromide at 120° C. for two and one-half hours. The excess acid is removed in vacuo on a steam bath and the residue is shaken with excess 3% sodium hydroxide solution and ether. The aqueous layer is separated and saturated with carbon dioxide whereupon 2-(3-hydroxy)-pyridyl phenyl ketone precipitates as yellow needles and is crystallized from methanol, M.P. 63° C.–65° C. Sixteen grams of the ketone so obtained, in 500 ml. of ether, is added, with stirring, to a solution of phenylmagnesium bromide (from 6.8 g. of magnesium and 51 g. of bromo-benzene), in 500 ml. of ether. The resultant mixture is refluxed for one hour, cooled, and 500 ml. of 10% ammonum sulfate is added. When decomposition is complete, the ether layer is separated, washed with water, and concentrated to about 200 ml. The concentrate is then chilled causing the separation of $\alpha,\alpha$-diphenyl-3-hydroxy-2-pyridinemethanol, which is recrystallized from benzene, M.P. 168–170° dec.

Fifteen grams of the above carbinol is hydrogenated as described in Example 1. When three mole equivalents of hydrogen are absorbed, the catalyst is filtered off and the solvent removed in vacuo. The residue is shaken with 5% sodium hydroxide solution and the compound which crystallizes is filtered off. Upon recrystallization from ethanol, there is obtained the compound of this example, M.P. 189–190° C.

The maleate salt prepared from the free base and an equivalent of maleic acid in isopropyl acetate melts at 239° C.–240° C.

EXAMPLE 5

1-methyl-2-benzhydryl-3-hydroxypiperidine

Five grams of 2-benzhydryl-3-hydroxypyridine (from Example 1) is dissolved in one liter of hot anhydrous benzene to which is added 3 g. of dimethyl sulfate. The oily quaternary pyridinium salt which precipitates is separated by decantation, washed with benzene, and crystallizes on scratching, M.P. 152° C.–154° C. (methanol-ethyl acetate). A solution of the salt in 200 ml. of water is decolorized with 0.5 g. of charcoal and filtered. The solution is hydrogenated at room temperature with 1 g. of platinum oxide catalyst in 200 ml. of acetic acid at 50 to 60 lbs. hydrogen pressure until 3 moles of hydrogen are absorbed. The catalyst is then filtered off and the solvent evaporated to a small volume in vacuo. The free base is liberated by shaking the residue with excess alkali and ether and the ether solution is dried over potassium carbonate, and filtered. The 1-methyl-2-benzhydryl-3-hydroxypiperidine is obtained as a hydrochloride by passing anhydrous hydrogen chloride through the solution and filtering the salt so formed, M.P. 300–303°, with decomposition.

Alternatively, 10 grams of 2-benzhydryl-3-hydroxypiperidine from Example 1 is dissolved in 150 ml. of acetic acid and 50 ml. of water, to which is added 4.5 g. of 37% formalin and 3 g. of palladium-charcoal catalyst. The solution is hydrogenated under 60 lbs. hydrogen pressure until one molar equivalent of hydrogen has been absorbed. The catalyst is filtered off and the solution is concentrated to a small volume in vacuo. The residue is shaken with ether and dilute sodium hydroxide. The ether extract is dried over anhydrous potassium carbonate, filtered and the ether is removed in vacuo. The residue is distilled to give 1-methyl-2-benzhydryl-3-hydroxy-piperidine as a thick viscous oil, B.P. 200–210° C./3 mm. which crystallizes when treated with hexane, M.P. 145–147°.

EXAMPLE 6 d-2-benzhydryl-3-hydroxypiperidine

Sixteen grams of $l$-tartaric acid and 26.4 g. of 2-benzhydryl-3-hydroxypiperidine are dissolved in 200 ml. of 80% alcohol and the solution is kept, without stirring, at 20° C.–25° C. for twenty hours. The salt crystallizes as long needles which are filtered off and recrystallized twice from 80% alcohol using 5 ml. of solvent per gram of salt. The pure $d$-2-benzhydryl-3-hydroxypiperidine $l$-tartrate is obtained as a monohydrate, M.P. 219° C.–221° C., with decomposition, $[\alpha]_D^{26}(+)12.9°$ (conc. (c.)=1% in dimethylformamide). This salt is shaken with ether and excess aqueous sodium hydroxide until all the solid dissolves, the ether is then separated, dried over anhydrous potassium carbonate, filtered and the ether distilled. The residue is crystallized from hexane giving pure $d$-2-benzhydryl-3-hydroxypiperidine M.P. 89° C.–90° C. $[\alpha]_D^{26}(+)93°$ (conc.=1% in dimethylformamide). The corresponding acid succinate is prepared by dissolving this isomeric base and an equivalent molecular amount of succinic acid in 95% alcohol M.P. 209°–210° C. $[\alpha]_D^{26}(+)26.6$ (c.+1% in dimethylformamide).

EXAMPLE 7 d-1-methyl-2-benzhydryl-3-hydroxypiperidine

METHOD A

Nine grams of the optically active base, $d$-2-benzhydryl-3-hydroxypiperidine, from Example 6 is dissolved in 150 ml. of 50% acetic acid and 12 ml. of 40% formalin. 1.5 g. of a 5% palladium-charcoal catalyst is added and the mixture is immediately hydrogenated in a low pressure hydrogenator. When the theoretical amount of hydrogen has been absorbed the reaction is stopped, the catalyst removed by filtration, and the solvent is removed by distillation in a vacuum. The residue is dissolved in 200 ml. 5% hydrochloric acid, and steam distilled to remove the excess formaldehyde. Excess aqueous sodium hydroxide is added; the amine is extracted into ether, dried over anhydrous potassium carbonate, filtered and the solvent is distilled. The solid remaining is crystallized from hexane and gives pure $d$-1-methyl-2-benzhydryl-3-hydroxypiperidine, M.P. 129–130.5°, $[\alpha]_D^{26}+203$ (c.=1% in dimethylformamide). The hydrochloride salt is prepared with dry HCl in isopropanol, M.P. 269–270.5°, $[\alpha]_D^{26}+83.6$ (c.=1% in dimethylformamide).

METHOD B

Ten grams of the optically active base from Example 6 is dissolved in 12 ml. 90% formic acid. 6.5 ml. of 37% formalin is added and the mixture is heated at 90° C.–100° C. for sixteen hours. Thirty ml. of 4 N hydrochloric acid is added and the heating is continued for two hours. The mixture is distilled to dryness on a water bath in a vacuum and the product is isolated and purified as described in Method A.

METHOD C

Fourteen grams of 1-methyl-2-benzhydryl-3-hydroxy-piperidine and 10 g. of $l$-phenylsuccinic acid are dissolved in 175 ml. of 95% alcohol and kept at room temperature for twenty-four hours. The resulting crystals are filtered off and crystallized twice from 85% alcohol giving pure $d$-1-methyl-2-benzhydryl-3-hydroxypiperidine-$l$-phenylsuccinate, M.P. 211° C.–213° C. with decomposition, $[\alpha]_D^{26}+37.7$ (c.=1% in dimethylformamide). The pure piperidine base is obtained from this salt with excess alkali and ether as described in Method A and its physical constants are identical with those obtained for the same compound.

EXAMPLE 8 l-1-methyl-2-benzhydryl-3-hydroxypiperidine

The procedure of Method C in Example 7 is repeated substituting $d$-phenylsuccinic acid for $l$-phenylsuccinic acid to yield pure l-1-methyl-2-benzhydryl-3-hydroxypiperidine, M.P. 128° C.–129° C., $[\alpha]_D^{26}-203°$ C. (c.=1% in dimethylformamide).

EXAMPLE 9 d-1-methyl-2-benzhydryl-3-acetoxypiperidine

Five grams of the $d$-1-methyl-2-benzhydryl-3-hydroxypiperidine from Example 7 and 5 ml. of acetic anhydride are warmed in a steam bath for one hour. The cooled mixture is diluted with ether and washed with cold sodium carbonate solution until free of excess anhydride. The ether is dried over anhydrous potassium carbonate, filtered and the base is crystallized from hexane to give $d$-1-methyl-2-benzhydryl-3-acetoxypiperidine, M.P. 97.5–99.5 $[\alpha]+133.4$ (c.=1% in dimethylformamide). The hydrochloride salt is prepared by adding dry hydrogen chloride to an ether solution of the base, M.P. 253° C.—254.5° C.

EXAMPLE 10 d-1-allyl-2-benzhydryl-3-hydroxypiperidine

Seventeen grams of $d$-2-benzhydryl-3-hydroxypiperidine, from Example 6, is refluxed and stirred with 40 g. anhydrous potassium carbonate in 300 ml. of anhydrous acetone, while a solution of 8 g. allyl bromide is 50 ml. of acetone is added slowly during one hour. The mixture is then refluxed for twelve hours, cooled, filtered free of potassium carbonate and the acetone is evaporated. The residue is dissolved in either, washed with water, dried, filtered and evaporated, the residual oil is distilled in vacuum to give 15 g. d-1-allyl-2-benzhydryl-3-hydroxypiperidine, B.P. 188–190° at 1.5 mm. Hg.

EXAMPLE 11

*d-α,α-diphenyl-3-hydroxy-2-piperidinemethanol*

Twenty-three grams of 2-(3-hydroxypiperidyl)-diphenyl carbinol from Example 4 is dissolved in 100 ml. of absolute alcohol and a solution of 11 g. l-malic acid in 10 ml. of water is added. On cooling to room temperature the salt crystallizes. It is recrystallized three times from 90% alcohol and pure d-α,α-diphenyl-3-hydroxy-2-piperidinemethanol l-malate is obtained. This salt is shaken with benzene and excess dilute alkali until all the salt dissolves. The benzene is separated, dried over anhydrous potassium carbonate, filtered and then evaporated. The residue is pure d-α,α-diphenyl-3-hydroxy-2-piperidinemethanol.

EXAMPLE 12

*2-(3-hydroxypiperidyl)-3,4-dimethylphenyl-phenyl-carbinol*

To the Grignard reagent prepared from 40 g. of 4-bromo-o-xylene and 5 g. of magnesium turnings in a liter of ether is slowly added 10 g. of the 2-(3-hydroxypyridyl) phenyl ketone from Example 4, in 300 ml. of ether. The mixture is refluxed for several hours then cooled and decomposed with 300 ml. of 10% ammonium sulfate solution. Stirring is continued and additional ether is added until all the solid dissolves. The ether layer is then separated, washed with water and evaporated. The residue of crude 2-(3-hydroxypyridyl)-3,4-dimethylphenyl-phenyl carbinol is purified by crystallization from benzene.

Ten grams of the above carbinol is hydrogenated with platinum as described in Example 1 until three molar equivalents of hydrogen are absorbed. The catalyst is then filtered off, the solvent is removed in vacuo and the residue is shaken with 5% sodium hydroxide until the oil solidifies. The solid is filtered off, washed with water, dried, and crystallized from methanol to give 2-(3-hydroxypiperidyl)-3,4-dimethylphenyl-phenyl-carbinol.

What is claimed is:
1. 2-benzhydryl-3-hydroxypiperidine.
2. 2-benzhydryl-3-hydroxy-6-methyl piperidine.
3. 2-benzhydryl-3-acetoxypiperidine.
4. 1-methyl-2-benzhydryl-3-hydroxypiperidine.
5. d-2-benzhydryl-3-hydroxypiperidine.
6. d-1-methyl-2-benzhydryl-3-hydroxypiperidine.
7. d-1-methyl-2-benzhydryl-3-acetoxypiperidine.
8. d-1-allyl-2-benzhydryl-3-hydroxypiperidine.
9. α,α-diphenyl-3-hydroxy-2-piperidinemethanol.
10. d-α,α-diphenyl-3-hydroxy-2-piperidinemethanol.
11. A compound selected from the group consisting of piperidine compounds of the formula:

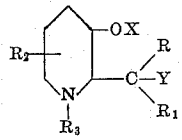

and the non-toxic acid addition salts thereof, wherein X is a member selected from the group consisting of H and lower alkanoyl; Y is a member selected from the group consisting of H, OH and lower alkanoyloxy; each of R and $R_1$ is a member selected from the group consisting of phenyl, lower alkyl phenyl, lower alkoxy phenyl and halo phenyl; $R_2$ is a member selected from the group consisting of H and lower alkyl; and $R_3$ is a member selected from the group consisting of H, lower alkyl and lower alkenyl.

12. An optically active isomer of a compound selected from the group consisting of piperidine compounds of the formula:

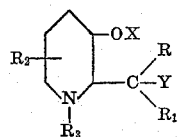

and the non-toxic acid addition salts thereof, wherein X is a member selected from the group consisting of H and lower alkanoyl; Y is a member selected from the group consisting of H, OH and lower alkanoyloxy; each of R and $R_1$ is a member selected from the group consisting of phenyl, lower alkyl phenyl, lower alkoxy phenyl and halo phenyl; $R_2$ is a member selected from the group consisting of H and lower alkyl; and $R_3$ is a member selected from the group consisting of H, lower alkyl and lower alkenyl.

References Cited in the file of this patent

UNITED STATES PATENTS

| | | |
|---|---|---|
| 2,833,775 | Sperber et al. | May 6, 1958 |
| 2,833,776 | Ruddy | May 6, 1958 |
| 2,849,453 | Hoffmann et al. | Aug. 26, 1958 |

OTHER REFERENCES

Fieser and Fieser: Organic Chemistry, 2nd edition, pp. 267–268 (1950).